(12) United States Patent
Lane

(10) Patent No.: US 8,002,191 B2
(45) Date of Patent: Aug. 23, 2011

(54) SEGMENTED MICROENCAPSULATED DISPLAY SYSTEM

(76) Inventor: Karen Nixon Lane, Plymouth, MI (US)

( * ) Notice: Subject to any disclaimer, the term of this patent is extended or adjusted under 35 U.S.C. 154(b) by 721 days.

(21) Appl. No.: 12/035,661

(22) Filed: Feb. 22, 2008

(65) Prior Publication Data

US 2008/0217412 A1    Sep. 11, 2008

Related U.S. Application Data

(60) Provisional application No. 60/902,788, filed on Feb. 22, 2007.

(51) Int. Cl.
*G06K 19/02* (2006.01)
(52) U.S. Cl. .......... 235/488; 235/375; 235/494
(58) Field of Classification Search .......... 235/375, 235/380, 382, 382.5, 487, 494, 488
See application file for complete search history.

(56) References Cited

U.S. PATENT DOCUMENTS

| | | | |
|---|---|---|---|
| 4,211,668 A | 7/1980 | Tate | |
| 4,419,383 A | 12/1983 | Lee | |
| 5,057,363 A | 10/1991 | Nakanishi | |
| 5,604,027 A | 2/1997 | Sheridon | |
| 5,930,026 A | 7/1999 | Jacobson et al. | |
| 6,068,183 A | 5/2000 | Freeman et al. | |
| 6,639,578 B1 | 10/2003 | Comiskey et al. | |
| 6,924,781 B1 | 8/2005 | Gelman | |
| 7,140,550 B2 | 11/2006 | Ramachandran | |
| 7,191,940 B2 * | 3/2007 | Wilcox et al. | 235/380 |
| 2002/0161640 A1 | 10/2002 | Wolfe | |
| 2002/0167500 A1 | 11/2002 | Gelman | |
| 2005/0134461 A1 | 6/2005 | Gelbman et al. | |
| 2005/0194454 A1 | 9/2005 | Ferber et al. | |
| 2006/0065741 A1 | 3/2006 | Vayssiere | |
| 2006/0169787 A1 | 8/2006 | Gelman | |
| 2006/0202042 A1 | 9/2006 | Chu | |

FOREIGN PATENT DOCUMENTS

| | | |
|---|---|---|
| WO | WO 98/03896 | 1/1998 |
| WO | WO 98/41898 | 9/1998 |
| WO | WO 98/41899 | 9/1998 |

* cited by examiner

*Primary Examiner* — Karl D Frech
(74) *Attorney, Agent, or Firm* — Brinks Hofer Gilson & Lione

(57) ABSTRACT

A segmented microencapsulated display system that includes a substrate upon which an image is produced in a layer of microencapsulated electrophoric elements and a unit remote from the substrate that includes electronics circuitry that creates the image produced in the layer of microencapsulated electrophoric elements.

18 Claims, 1 Drawing Sheet

FIG - 1
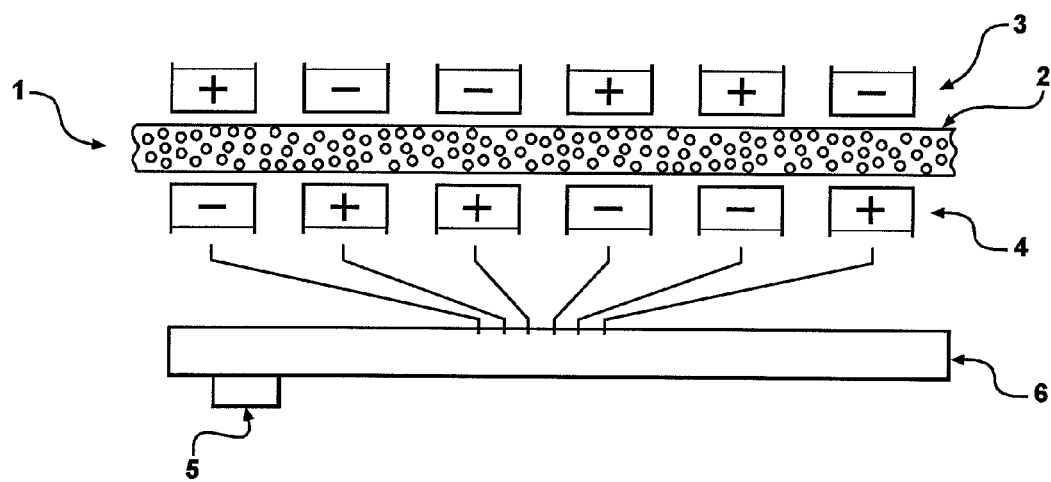
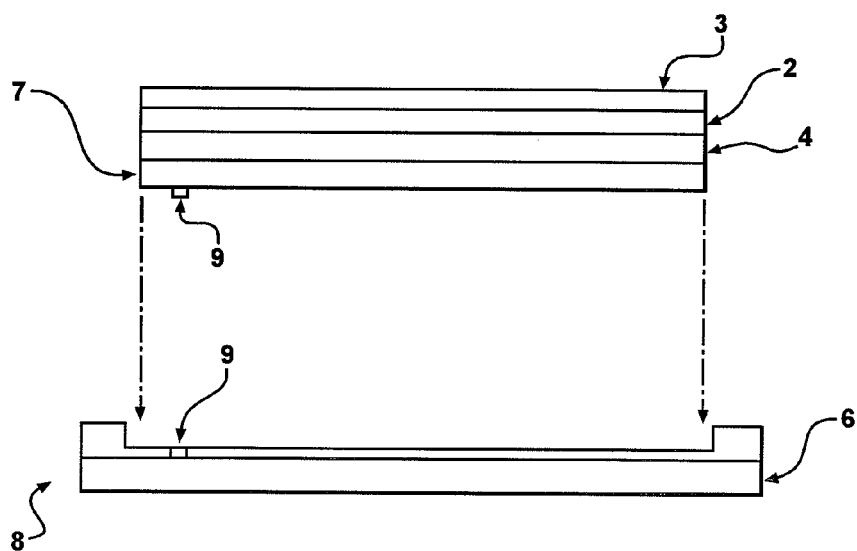
FIG - 2

SEGMENTED MICROENCAPSULATED DISPLAY SYSTEM

RELATED APPLICATIONS

This application is based upon and claims priority under 35 U.S.C. §120 to U.S. provisional patent application Ser. No. 60/902,788, filed Feb. 22, 2007.

TECHNICAL FIELD

The present invention relates to consumer cards that are provided with changeable image and/or text displays. In particular the present invention is directed to a consumer card such as a credit card, smart card, bank card, debit card, ATM card, store card, gift card, shopper club card or any similar portable card, that has an electronic paper display thereon.

BACKGROUND ART

Electronic paper, also referred to as e-paper, electronic ink or e-ink, is a display technology that was developed to mimic the appearance of regular ink on paper. Unlike a conventional flat panel display that uses a backlight to illuminate its pixels, electronic paper reflects light like ordinary paper and is capable of holding text and images indefinitely without drawing electricity or using processor power, while allowing displayed text and/or images to be changed. One important feature is that the pixels be image stable so that the state of each pixel can be maintained without a constant power supply.

Electronic paper was originally developed to overcome some of the limitations of computer monitors. For example, the backlighting of monitors is hard on the human eye, whereas electronic paper reflects light just like normal paper. Electronic paper is also easier to read angles than flat screen monitors.

The first electronic paper was developed in the 1970s by Nick Sheridon and consisted of polyethylene spheres between 20 and 100 micrometers across. Each sphere was composed of negatively charged black plastic on one side and positively charged white plastic on the other side. The spheres are embedded in a transparent silicone sheet, with each sphere suspended in a bubble of oil so that the sphere were allowed to rotate freely. A voltage having a predetermined polarity applied to each sphere determined whether the white or black side of the sphere would rotate so as to face-up, thus giving the pixel, defined by each sphere, a white or black appearance.

In the 1990s another type of electronic paper was invented by Joseph Jacobson which used tiny microcapsules filled with electrically charged white particles suspended in a colored oil. In early versions, the underlying circuitry controlled whether the white particles were at the top of the capsule (so it looked white to the viewer) or at the bottom of the capsule (so the viewer saw the color of the oil). This was essentially a reintroduction of the well-known electrophoretic display technology, but the use of microcapsules allowed the display to be used on flexible plastic sheets instead of glass.

One early version of electronic paper consisted of a sheet of very small transparent capsules, each about 40 micrometers across. Each capsule contained an oily solution containing black dye (the electronic ink), with numerous white titanium dioxide particles suspended within the capsule. The particles are slightly negatively charged, and each one is naturally white. The microcapsules were held in a layer of liquid polymer, sandwiched between two arrays of electrodes, the electrode was made from indium tin oxide, a transparent conducting material. The two electrode arrays were aligned so that the sheet was divided into pixels, which each pixel corresponding to a pair of electrodes situated either side of the sheet. The sheet was laminated with transparent plastic for protection, resulting in an overall thickness of 80 micrometers, or twice that of ordinary paper.

On Oct. 18, 2005, E Ink Corporation announced an advanced electronic paper color prototype featuring 12-bit color in a 400×300 pixel format with a resolution of 83 pixels per inch. The display used a custom color filter from strategic partner Toppan Printing Co., LTD. and featured a high-brightness layout (RGBW) that preserves the paper-like whiteness of the background page while enabling deep blacks for text and a range of colors and tones for images.

Electronic paper has many applications and is particularly suitable for displays which are used in situations or applications in which a range of lighting and viewing angles are importance.

Electronic paper has been proposed for use in conjunction with banking cards, an example of which is U.S. Pat. No. 7,104,550 to Ramachandran that discloses a multifunction card that includes a programmable memory, a magnetic stripe, and an electronic ink display. The appearance of the electronic ink display can be changed in accordance with a selected account allowing a single multifunction card to substitute for many different cards.

U.S. Patent Application No. 20060065741 to Vayssiere discloses a smartcard that includes a dynamic display portion made of an electronic ink, in which the dynamic display portion changes from a first display to a second display in response to an application use of the smartcard.

Electronic paper typically requires a layer of microencapsulated electrophoric elements that are generally provided on a support sheet, a pair of electrodes situated on either side of the layer of microencapsulated electrophoric elements, a power supply, and an electronics package that includes a driver or power circuitry for operating the display. These components of electronic paper displays are exemplified by U.S. Pat. Nos. 6,639,578 to Comiskey, 5,930,026 to Jacobson et al. and International Publication Nos. WO 98/41899 to Jacobson et al. and WO 98/41898 to Turner et al, the entire disclosures of which are hereby expressly incorporated herein by reference.

The present invention provides a card that includes a changeable display that is based upon electronic paper technology. The card can be in the form of a credit card, smart card, bank card, debit card, ATM card, store card, gift card or any similar portable card.

DISCLOSURE OF THE INVENTION

According to various features, characteristics and embodiments of the present invention which will become apparent as the description thereof proceeds, the present invention provides a segmented microencapsulated display system which comprises:

a substrate having a display that comprises a layer of microencapsulated electrophoric elements and the pair of electrodes; and a unit remote from the substrate that comprises an electronics package that includes a driver or power circuitry for supplying a signal to the substrate that activates the display.

The present invention further provides a substrate having a display provided thereon, said substrate comprising one of a card, label, name tag, place card, business card, price tag, and a display stand, and the display consisting essentially of layer of microencapsulated electrophoric elements and the pair of electrodes.

The present invention also provides a microencapsulated display system that includes:

a substrate upon which an image is produced in a layer of microencapsulated electrophoric elements; and a unit remote from the substrate that comprises electronics circuitry that creates the image produced in the layer of microencapsulated electrophoric elements.

BRIEF DESCRIPTION OF DRAWINGS

The present invention will be described with reference to the attached drawings which are given as non-limiting examples only, in which:

FIG. 1 is a schematic diagram scheme of how a conventional electronic paper display is made and used.

FIG. 2 is a schematic diagram of an electronic paper display scheme according to one embodiment of the present invention.

BEST MODE FOR CARRYING OUT THE INVENTION

The present invention is directed to a consumer card such as a credit card, smart card, bank card, debit card, ATM card, store card, gift card, shopper club card or any similar portable card, that has an electronic paper display thereon or therein. The display can be used to produce any desired image, including text, graphic images or mixtures thereof. The displayed image can be changed according any desired scheme. Non-limiting examples of the types of images that can be displayed include balances (e.g. for gift cards), credit limits and/or balances (e.g. for credit cards), general account information, promotional materials, merchant and/or manufacturer coupons and/or discounts, etc. As will be understood as the description of the invention proceeds, the present invention is primarily directed to a manner of implementing an electronic paper image on a card and is not specifically limited the types of images that are displayed or the manner or controlling or determining what images are displayed. In this regard, the cards of the present invention can be used in any conventional manner to display any type of image and are not particularly limited to the manners or images that are specifically recited herein.

It is further noted that the cards are not specifically limited to wallet-sized card elements. In other embodiments the present invention is applicable to labels, name tags, place cards, business cards, price tags, display stands, etc.

The invention will be hereafter described in references to the attach drawings in which common reference numerals are used to identify similar elements when possible to simplify the description.

FIG. 1 is a schematic diagram scheme of how a conventional electronic paper display is made and used. As shown the electronic paper display includes a layer of microencapsulated electrophoric elements 1 that are generally provided in or on a support sheet 2 and a pair of electrodes 3 and 4 situated either side of the layer of microencapsulated electrophoric elements 1. The microencapsulated electrophoric elements 1 can be bichromal balls having two different colored hemispheres with each hemisphere having different electrical properties, with each ball enclosed within a spherical shell and surrounded, within the shell, by a liquid that allows the balls to freely rotate within the shells. In an alternative embodiment, the microencapsulated electrophoric elements 1 can be microcapsules that contain a dielectric fluid and a suspension of particles that visually contract with the dielectric fluid and also exhibit surface charges. Microencapsulated electrophoric elements that are useful according to the present invention, include any known type that provide a stable image without being updated or without the need for application of an electrical potential after an image is developed. In general microencapsulated electrophoric elements that produce bistable displays are useful for purposes of the present invention. That is, displays in which the optical state remains fixed once the addressing voltage is removed.

Of the two electrodes, the top electrode 3 is transparent, e.g. made from indium tin oxide, a transparent conducting material. Further the transparent top electrode can be covered with a plastic protective layer (not shown).

The electrodes are configured or patterned in a known manner to allow for addressing of selective ones of the individual microencapsulated electrophoric elements.

The electronic paper display includes a power supply such as a battery 5 or inductor circuit that can apply a potential of a desired polarity to individual ones of the microencapsulated electrophoric elements, via the electrodes 3, 4.

In addition, the electronic paper display includes an electronics package 6 that includes a driver or power circuitry for operating the display. Typical drivers include a plurality of both row and column drivers that are used for addressing specific areas of the electrodes to which a potential of a desired polarity is applied so as to activate the individual microencapsulated electrophoric elements.

Another variation of e ink or electronic paper utilizes a thin film transistor (TFT) array, an intermediate layer of microencapsulated electrophoric elements and a common electrode. The TFT array includes a plurality of scan lines and a plurality of data lines that define a plurality of pixel units that are arranged in a matrix. Each FTF array is driven by the corresponding scan line and data line.

FIG. 2 is a schematic diagram of an electronic paper display scheme according to one embodiment of the present invention. As shown, the present invention provides a display that includes a layer of microencapsulated electrophoric elements 1 that are generally provided in or on a support sheet 2 and a pair of electrodes 3 and 4 situated either side of the layer of microencapsulated electrophoric elements 1.

The display can be provided on, or incorporated in, any type of card noted above, or to labels, name tags, place cards, business cards, price tags, display stands, etc. and covered with a protective plastic layer if desired.

In a separate docking station, a power supply and electronics package 6 that includes a driver or power circuitry for operating the display are provided. The docketing station 8 and the substrate 7 supporting the display, i.e., the card, label, name tag, place card, business card, price tags, display stands, etc., are provided with cooperating electrical contacts 9 by which the electronics package 6 can supply a driving signal to the pair of electrodes 3 and 4 to cause a desired to be displayed on the display. The cooperating electrical contacts 9 can be provided on any convenient location on the docketing station 8 and the support substrate 7 and can be of any desired configuration. Once the image is displayed, the substrate 7 supporting the display can be removed from the docketing station and the image will remain displayed on the display, due to the bistable nature of the microencapsulated electrophoric elements 1.

The docketing station 8 can comprise a card reader that can function in a conventional manner to read optical or magnetic information from the substrate 7 supporting the display.

In an alternative embodiment rather than transferring the driving signal between the docketing station 8 and pair of electrodes 3 and 4 through cooperating electrical contacts on the docketing station and substrate 7 supporting the display, the driving signal could be transmitted from the docketing station and received by a receiver provided in the substrate 7 supporting the display. In such an arrangement the substrate 7 supporting the display could either be provided with an onboard power supply or with an inductor circuit that could generate the necessary potential to change images displayed on the display.

The present invention allows the substrate supporting the display to be fabricated with a minimum of elements, including the layer of microencapsulated electrophoric elements 1 and the pair of electrodes 3 and 4, which will greatly reduce the cost of providing onboard displays on cards, labels, name tag, place card, business card, price tags display stands, etc.

As can be understood, the present invention segments the components of a microencapsulated display so that a minimum number of components that are required to form and maintain an image are implemented on a card or similar substrate and the remaining components that are required to create the image, including the power supply, drivers and driver circuitry, TFT array, etc. are provided in a remote matter such as a docking station. This unique configuration allows the cards or substrates, which can be mass produced for distributing to consumers, to be fabricated at a lower cost, since components such as the power supply, drivers and driver circuitry, TFT array, etc. do not have to be implemented on each of the individual cards or substrates. As can be further understood, the present invention can segment the elements of a microencapsulated display between a card or substrate and a remote system in various manners, so that when fewer elements, such as a minimum necessary, are provided on the card or substrate, the cost of the card or substrate is compatibly reduced, whereas when more element are provided on the card or substrate, the cost of the card or substrate is compatibly increased. The upper limit of elements provided on the card or substrate, being less than all the elements of a fully, independent functioning microencapsulated display.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above.

What is claimed is:

1. A segmented microencapsulated display system which comprises:
    a substrate having a display that comprises a layer of microencapsulated electrophoric elements and the pair of electrodes; and
    a unit remote from the substrate that comprises an electronics package that includes a driver or power circuitry for supplying a signal to the substrate that activates the display,
    wherein the substrate and the remote unit are configured so that the substrate can be removable coupled to the remote unit so that when the substrate and remote unit are coupled together the remote unit can produce an image displayed on the display of the substrate and when the substrate and remote unit are not coupled together the image is displayed on the display of the substrate.

2. A segmented microencapsulated display system according to claim 1, wherein the substrate comprises one of a card, label, name tag, place card, business card, price tag, and a display stand.

3. A segmented microencapsulated display system according to claim 2, wherein the card comprises one of a credit card, smart card, bank card, debit card, ATM card, store card, gift card and a shopper club card.

4. A segmented microencapsulated display system according to claim 1, wherein the unit remote comprises a docketing station for the card.

5. A segmented microencapsulated display system according to claim 1, wherein the unit remote comprises a card reader.

6. A segmented microencapsulated display system according to claim 1, wherein the unit remote comprises a power supply for the substrate.

7. A segmented microencapsulated display system according to claim 1, wherein the substrate and the unit remote include cooperating electrical contacts by which the electronics package can supply a driving signal to the pair of electrodes to cause a desired to be displayed on the display.

8. A segmented microencapsulated display system according to claim 1, wherein the substrate includes a receiver and the unit remote includes a transmitter for transmitting a driving signal receiver to activate the display.

9. A substrate having a display provided thereon, said substrate comprising one of a card, label, name tag, place card, business card, price tag, and a display stand, and the display consisting essentially of layer of microencapsulated electrophoric elements and the pair of electrodes,
    said substrate being configured to be removable coupled to a remote unit provided with an electronics package that includes a driver or power circuitry for supplying a signal to the substrate that activates the display so that when the substrate and remote unit are coupled together the remote unit can produce an image displayed on the display of the substrate and when the substrate and remote unit are not coupled together the image is displayed on the display of the substrate.

10. A substrate having a display provided thereon according to claim 9, wherein the card comprises one of a credit card, smart card, bank card, debit card, ATM card, store card, gift card and a shopper club card.

11. A microencapsulated display system that comprises:
    a substrate upon which an image is produced in a layer of microencapsulated electrophoric elements; and
    a unit remote from the substrate that comprises electronics circuitry that creates the image produced in the layer of microencapsulated electrophoric elements,
    wherein the substrate and the remote unit are configured so that the substrate can be removable coupled to the remote unit so that when the substrate and remote unit are coupled together the remote unit can produce an image displayed on the display of the substrate and when the substrate and remote unit are not coupled together the image is displayed on the display of the substrate.

12. A segmented microencapsulated display system according to claim 11, wherein the substrate comprises one of a card, label, name tag, place card, business card, price tag, and a display stand.

13. A segmented microencapsulated display system according to claim 12, wherein the card comprises one of a credit card, smart card, bank card, debit card, ATM card, store card, gift card and a shopper club card.

14. A segmented microencapsulated display system according to claim 11, wherein the unit remote comprises a docketing station for the card.

15. A segmented microencapsulated display system according to claim 11, wherein the unit remote comprises a card reader.

16. A segmented microencapsulated display system according to claim 11, wherein the unit remote comprises a power supply for the substrate.

17. A segmented microencapsulated display system according to claim 11, wherein the substrate and the unit remote include cooperating electrical contacts by which the electronics package can supply a driving signal to the pair of electrodes to cause a desired to be displayed on the display.

18. A segmented microencapsulated display system according to claim 11, wherein the substrate includes a receiver and the unit remote includes a transmitter for transmitting a driving signal receiver to activate the display.

* * * * *